Figure 1:
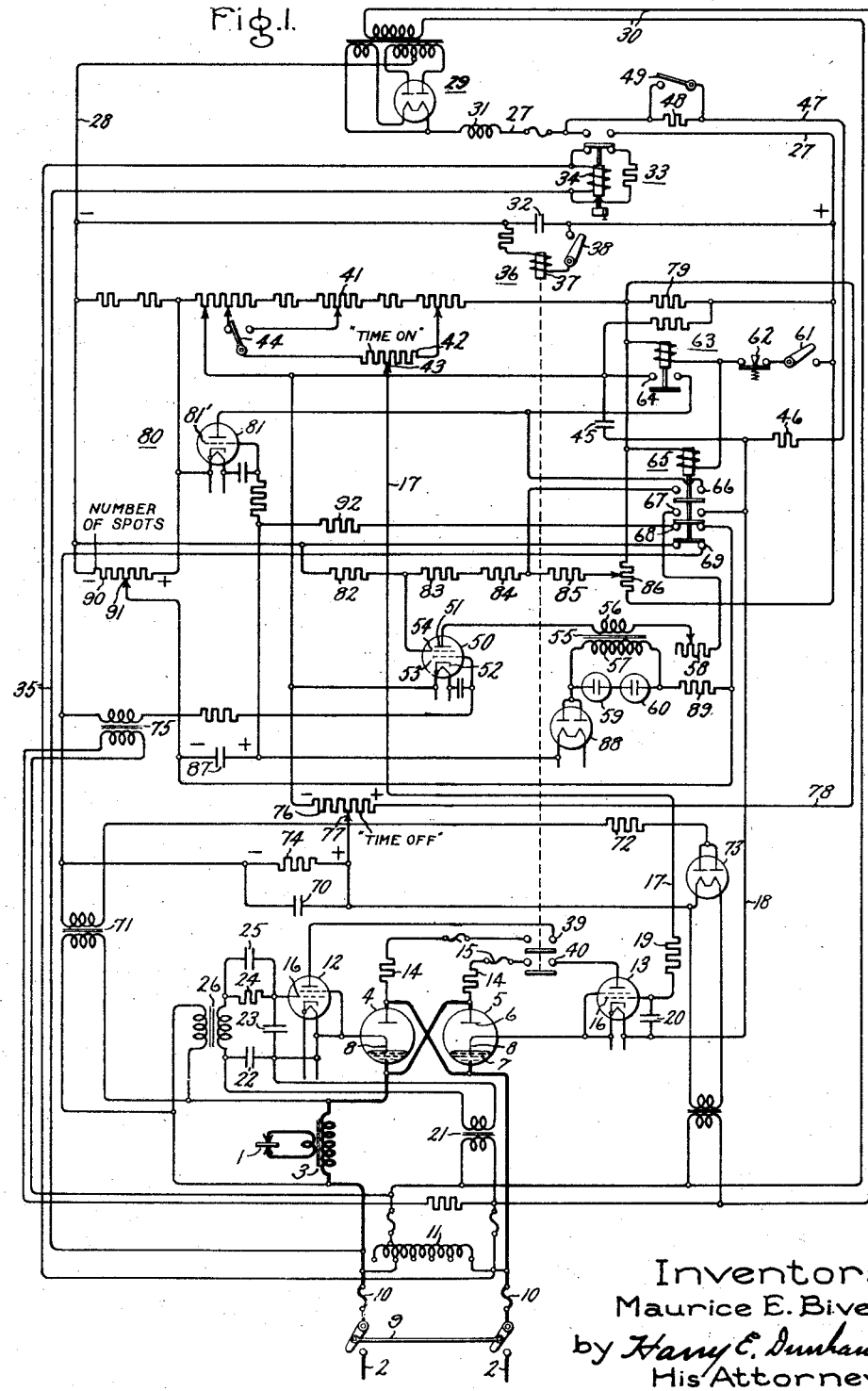

Dec. 31, 1940.                M. E. BIVENS                2,227,120
                         ELECTRIC VALVE CIRCUIT
                        Filed Sept. 8, 1939        2 Sheets-Sheet 1

Inventor:
Maurice E. Bivens,
by Harry E. Dunham
His Attorney.

Dec. 31, 1940.　　　　　M. E. BIVENS　　　　2,227,120
ELECTRIC VALVE CIRCUIT
Filed Sept. 8, 1939　　　2 Sheets-Sheet 2

Inventor:
Maurice E. Bivens.
by Harry E. Dunham
His Attorney

Patented Dec. 31, 1940

2,227,120

UNITED STATES PATENT OFFICE 2,227,120

ELECTRIC VALVE CIRCUIT

Maurice E. Bivens, Schenectady, N. Y., assignor to General Electric Company, a corporation of New York Application September 8, 1939, Serial No. 293,958

12 Claims. (Cl. 172—281)

My invention relates to electric translating apparatus and more particularly to electric valve translating apparatus which effects periodic energization of a load circuit.

Electric valve apparatus has been found very satisfactory in effecting periodic energization of load circuits, such as welding circuits, from an alternating current supply circuit. For example, in many welding operations it is desired to effect periodic energization of the welding circuit. In seam welding operations and in interrupted spot welding operations, the welding circuit is periodically energized from the alternating current supply circuit. It is quite uniformly important to provide control apparatus which determines precisely the period of each energization of the load circuit, and just as important in many instances to determine the interval of time between each periodic energization. Heretofore, the period of energization of the load circuit and the welding cycle have been established by auxiliary timing means, such as single valve inverter circuits, energized from an associated direct current source. In accordance with the teachings of my invention described hereinafter, I provide a new and improved electric valve control system whereby the periods of energization of the load circuit are more accurately determinable and in which the period or interval between successive periodic energizations is also accurately determinable.

It is an object of my invention to provide a new and improved electric translating circuit.

It is another object of my invention to provide a new and improved electric valve translating circuit for effecting periodic energization of a load circuit from an alternating current supply circuit.

It is a further object of my invention to provide a new and improved electric valve circuit for generating electrical timing quantities.

It is a still further object of my invention to provide a new and improved electric valve circuit for energizing an alternating current load circuit from an alternating current supply circuit, and in which the energization of the load circuit is effected periodically, the interval or period of time between successive energizations of the load circuit being effected by means of a control circuit energized in response to the voltage appearing across a transformer connected between the supply circuit and the load circuit.

Briefly stated, in the illustrated embodiment of my invention I provide an improved electric valve translating circuit for energizing a load circuit, such as a welding circuit, from an alternating current supply circuit through a pair of reversely connected main electric valve means. I provide a new and improved single valve inverter circuit for generating a periodic voltage which determines the duration or length of each energization of the load circuit, and I provide an additional improved circuit, independently adjustable, for controlling the length or period of time between each successive periodic energization of the load circuit.

Figure 2:
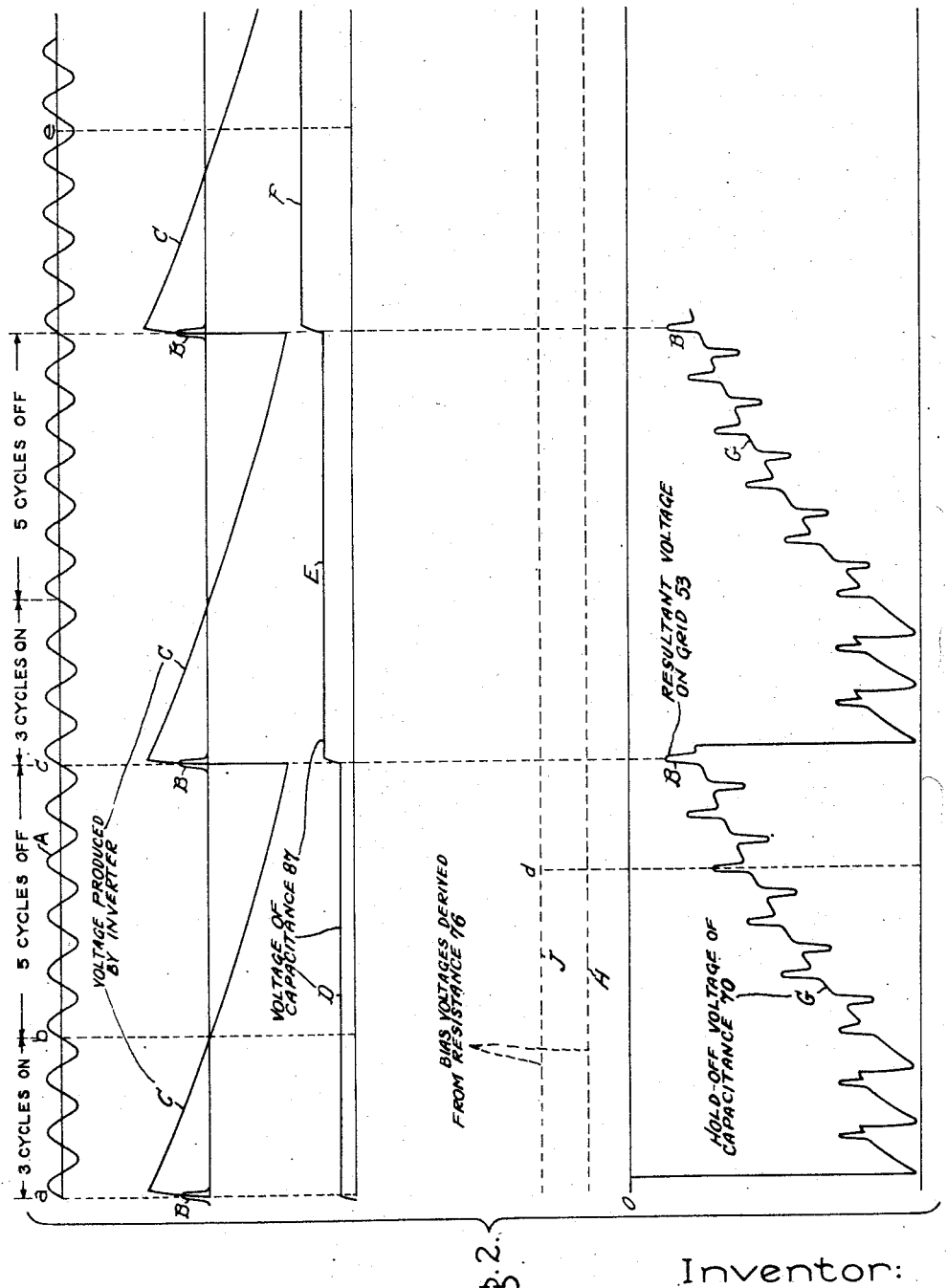

For a better understanding of my invention, reference may be had to following description, taken in connection with the accompanying drawings, and its scope will be pointed out in the appended claims. Fig. 1 of the drawings diagrammatically illustrates an embodiment of my invention as applied to a welding system, and Fig. 2 represents certain operating characteristics thereof.

Referring now to Fig. 1 of the drawings, I have diagrammatically illustrated my invention as applied to an electric valve translating system for effecting periodic energization of a load circuit, such as a welding circuit, from an alternating current supply circuit 2 through translating apparatus comprising a transformer 3 and a pair of reversely connected main electric valve means 4 and 5. The electric valve means 4 and 5 each may comprise an anode 6, a cathode 7 and may include a control member 8 of the make-alive or immersion-igniter type comprising a material, such as boron-carbide or silicon-carbide, having a specific electrical resistivity relatively large with respect to that of the associated mercury pool cathode 7. A switch 9 may be connected in series relation with the supply circuit 2 and the translating apparatus, and current limiting devices, such as fuses 10, may be connected in series relation with the translating apparatus. An autotransformer 11 with adjustable taps may be connected to the circuit 2 to provide a convenient source of alternating voltage for the associated equipment described hereinafter.

The main power electric valves 4 and 5 may be arranged to conduct current in a leading and following relationship; that is, the electric valve 5 may be rendered conductive by means of the circuits described hereinafter, and the electric valve 4 may conduct current during each half cycle following those half cycles of conduction effected by electric valve 5. Control or trigger electric valves 12 and 13 are associated with electric valves 4 and 5, respectively, and transmit to the control members 8 thereof unidirectional impulses of current to render the valves conductive.

The control valves 12 and 13 may be energized in response to the anode-cathode voltage of the associated main valve through current limiting resistances 14 and protective means, such as fuses 15. The electric valves 12 and 13 are preferably of the type employing an ionizable medium and each comprises a control grid 16 for selectively rendering the valve conductive or maintaining it nonconductive. The control valve 13 which energizes the control member 8 of the main valve 5 is energized from an electric valve circuit which generates a periodic electrical timing quantity and which is described hereinafter. The grid circuit of the control electric valve 13 is connected to this generating circuit through an intermediate connecting circuit comprising conductors 17 and 18, and a current limiting resistance 19 may be connected in series relation with the grid. A suitable capacitance 20 may be connected across the grid and the cathode of the trigger valve 13 to absorb extraneous transient voltages. The control circuit for the trailing electric valve 4 comprises, in addition to the control valve 12, an excitation circuit for the latter valve. This excitation circuit comprises means tending to maintain the control valve 12 nonconductive. This may be effected by means of a biasing potential derived from the alternating current circuit 2 through a transformer 21 which has a secondary winding connected across a capacitance 22. A filtering capacitance 23 may be connected across the cathode and the grid 16 of the control valve 12, and a self-biasing type of circuit comprising a parallel connected resistance 24 and a capacitance 25 may be connected to the grid. In order to render the control electric valve 12 conductive and hence to render the associated main valve 4 conductive after each half cycle of conduction by electric valve 5, I employ means, such as a transformer 26, for introducing into the grid circuit for valve 12 a voltage in response to the energization of the welding circuit 1. The transformer 26 may be energized in response to the voltage applied to the transformer 3, and the voltage introduced into the grid circuit is sufficient to overcome the bias voltage produced by transformer 21 and the negative unidirectional biasing potential produced by resistance 24 and capacitance 25.

A suitable source of direct current comprising conductors 27 and 28 is employed. The source of direct current may be supplied by a rectifier 29 energized from the alternating current circuit 2 through conductors 30. In order to produce a substantially constant unidirectional voltage, a filter circuit may be employed comprising an inductance 31 and a capacitance 32. To prevent the connection of the direct current source to the control apparatus described hereinafter, a suitable time delay relay 33 may be connected in series relation with the conductor 27 to assure a sufficient interval of time within which the cathodes of the associated electric valves may attain a safe operating temperature. The operating coil 34 of the time delay relay 33 may be connected to transformer 11 through conductors 35 to energize coil 34 simultaneously with the closing of switch 9.

As a means for connecting the anode-cathode circuits of the control valves 12 and 13 in operative relation with the main or power valves 4 and 5, a suitable contactor or relay 36 may be employed comprising an actuating coil 37 in series relation with a switch 38 and having contacts 39 and 40.

I provide a new and improved circuit for producing a periodic electrical timing quantity or impulse, such as a periodic voltage, to render the electric valve means 4 and 5 conductive during accurately determinable intervals of time. This generating circuit, which may be generally identified as a single valve inverter circuit, comprises a voltage divider including a resistance 41, connected across the direct current source including conductors 27 and 28, and is provided with an intermediate connection having a potential intermediate that of conductors 27 and 28. This intermediate connection may be furnished by a voltage divider including a resistance 42 which bridges a portion of the resistance 41 and which is provided with an adustable intermediate connection 43. A switch 44 may be employed to provide a means for effecting a definite predetermined change in the potential of the intermediate connection 43, and hence for preselecting different predetermined "time on" intervals. As will be explained in the following description, the adustment of the intermediate connection 43 affords a means for controlling the length of the "time on" intervals or the duration of the intervals of energization of circuit 1. The inverter circuit also includes a capacitance 45 which is connected to be charged from a direct current source through a resistance 46, conductor 47, and a resistance 48. When it is desired to effect a change in the time constant of the charging circuit for the capacitance 45, a suitable switch 49 may be connected across a portion of the charging resistance in circuit with the capacitance 45. This switch may be connected across the resistance 48, if desired. As a means for periodically discharging the capacitance 45 to generate the periodic control voltage, I provide a control electric valve 50, preferably of the type employing an ionizable medium such as a gas or a vapor, and which may include an anode 51, a cathode 52, a control grid 53 and a shield grid 54. Electric valve 50 is of the type which may be maintained nonconductive if either of the grids 53 or 54 is at a sufficiently negative potential. In series relation with the anode-cathode circuit of the electric valve 50, I provide an inductive device, such as a transformer 55, having a primary winding 56 and a secondary winding 57. If desired, an adjustable resistance 58 may be connected in series relation with the primary winding 56. In order to obtain an accurate and uniform control voltage, irrespective of variations in the magnitude of the charge on capacitance 45 at the time of initiation of discharge thereof, I connect a voltage responsive means across the secondary winding of transformer 57. For example, I employ means, such as glow discharge devices, having critical minimum operating potential characteristics or critical minimum ionizing-potential characteristics. If the design of the transformer 55 requires it, I may connect a pair of glow discharge valves 59 and 60 in series relation across the secondary winding 57. The glow discharge devices 59 and 60 are arranged and designed to break down at a specific value of secondary voltage and are also arranged to become nonconductive at a specific lower value of secondary voltage, so that the resultant flux in the transformer 55 is always at that value which upon decay will effect complete discharge of the capacitance 45. In other words, the transformer 55 and the glow discharge devices 59 and 60 assure discharge of the capacitance 45 to zero voltage at the termination of each discharge period. Of course, an autotransformer could be used in place of transformer 55, and the glow discharge devices could be connected across all or part of the winding thereof.

To initiate the operation of the generating circuit which impresses the periodic control voltage on grid 16 of control valve 13 through conductors 17 and 18, I provide a suitable circuit which may include an initiating switch 61, a reset switch 62, and a pickup or initiating relay 63 having contacts 64. In addition, I provide a starting relay 65 having contacts 66—69. The actuating coil of the relay 65 is energized upon closure of switch 61. Capacitance 45 is charged through contacts 64 and 66 when the relays are in the energized positions. Contacts 67 close the discharging circuit for the capacitance 45.

The control electric valve 50 is rendered conductive synchronously with respect to the voltage of the alternating current circuit 2 to control the time of initiation of the periodic control voltage. I provide a new and improved control circuit for determining the "time off" or the length of time between the successive intervals of energization of the welding circuit 1. The broad feature of providing independently adjustable "time on" and "time off" controls is disclosed and claimed in a copending patent application of Yosio Matusita, Serial No. 220,157, filed July 19, 1938 and assigned to the assignee of the present application. I provide an improved "time off" control which is energized in response to the energization of the load circuit or the welding circuit 1 and which independently controls the intervals between the successive energizations. The "time off" control circuit comprises a capacitance 70 which is charged in response to the energization of the load circuit 1 from the alternating current circuit 2 and which comprises a charging circuit including a transformer 71, a resistance 72 and a suitable unidirectional conducting device 73. The time constant of this charging circuit, including resistance 72 and capacitance 70, is equal to or less than one-half period of the voltage of the alternating current circuit 2 or substantially less than one period of the voltage of circuit 2. In other words, the capacitance 70 is always charged within one-half cycle of voltage of circuit 2. I provide a discharging circuit for the capacitance 70 including a resistance 74. The time constant of this discharging circuit may be maintained at a substantially constant value if desired, but is substantially greater than the time constant of the charging circuit. The interval of time between the successive periods of conduction of the control electric valve 50 is determined by three voltages which are impressed on the control grid 53 thereof. These three voltages are the voltage of peaked wave form and of fixed phase displacement provided by a suitable device, such as a peaking transformer 75, the discharge or "hold-off" voltage of the capacitance 70 appearing across the terminals of resistance 74, and a third adjustable bias voltage which determines, in conjunction with the "hold off" voltage of capacitance 70, the time between the successive periods of conduction of valve 50, or the interval of time between the successive energizations of the welding circuit 1. This bias voltage acts in opposition to the discharge voltage of capacitance 70 and may be provided by a suitable means, such as a voltage divider including a resistance 76 having an adjustable contact 77. The resistance 76 may be energized from the direct current circuit including conductors 27 and 28 through a portion of the resistance 41 and through a conductor 78 and a resistance 79. The voltage divider, including resistance 76, impresses a variable or adjustable positive bias voltage on the control grid 53 of valve 50, and the capacitance 70 superimposes thereon an exponential negative "hold-off" voltage. The voltage of peaked wave form produced by transformer 75 effects initiation of the generation of the periodic voltage at a specific time relative to the voltage of circuit 2.

In order to effect deenergization of the load circuit 1 after the transmission of a predetermined number of impulses of current thereto, I provide a lockout circuit 80 which maintains the control electric valve 50 nonconductive after the generation of a predetermined number of impulses of control voltage by the inverter circuit. This lockout circuit may comprise an electric valve 81, preferably of the type employing an ionizable medium and having a control grid 81'. During the time within which the inverter circuit is generating the required number of impulses of periodic voltage, the electric valve 81 is nonconductive and the voltage impressed on the shield grid 54 is substantially positive so that the control grid 53 is effective in controlling the conductivity of valve 50. A suitable voltage divider, including resistances 82—86, may be energized from the direct current source for impressing a sufficiently positive voltage on the shield grid. When the electric valve 81 is conductive, the potential of the shield grid 54 of the control valve 50 is lowered sufficiently in potential to maintain the electric valve 50 nonconductive, thereby locking out the inverter circuit.

As an agency for effecting precise control of the interval of energization of the welding circuit 1, or, in other words, in order to lock out the system after the transmission of a predetermined amount of energy to the welding circuit 1, or after a predetermined number of energizations of circuit 1, I provide a counting or integrating circuit for controlling the conductivity of the electric valve 81. This circuit comprises a capacitance 87, a unidirectional conducting device 88 and a charging resistance 89. The capacitance 87 is connected to be energized from the secondary winding 57 of transformer 55 when the glow discharge valves 59 and 60 are conductive. The charging of the capacitance 87 establishes a positive voltage which is impressed on grid 81' of valve 81, and this voltage acts in opposition to a variable negative unidirectional biasing potential which may be provided by a voltage divider including a resistance 90 having an adjustable contact 91. By adjusting the contact 91, the number of impulses of periodic voltage generated by the inverter circuit may be adjusted and hence the number of periodic energizations of the load circuit may be adjusted or pre-selected. I provide a discharge circuit for the capacitance 87 including a resistance 92 which is connected across the capacitance 87 through contacts 68 of relay 65.

The operation of the embodiment of my invention shown in Fig. 1 of the drawings may be explained by considering the system when it is operating to effect periodic energization of the welding circuit 1 during a predetermined interval of time. That is, the circuit will be explained for an interrupted spot welding operation. Upon closure of the switch 9, power is applied to the cathode heating elements of the various electric valves and after the lapse of a predetermined interval of time, the time delay relay 33 will operate to connect the direct current source to the single valve inverter. After such operation, the circuit may be placed in operation by closing switches 38 and 61. Closure of switch 38 operates relay 36 to close the anode-cathode circuits for the control or trigger valves 12 and 13. Due to the fact that a relatively negative voltage is impressed on the control grid 16 of the control valve 13, this valve is maintained nonconductive and hence no current is transmitted to the welding circuit 1. Upon closure of the switch 61, the relays 63 and 65 are actuated. Closure of contacts 64 of relay 63 completes the charging circuit for capacitance 45 through a circuit including contacts 64 of relay 63 and contacts 66 of relay 65 and resistances 82—84. It will be noted that inasmuch as contacts 69 are normally closed, capacitance 70 is initially charged from the direct current source to prevent an undesired firing of the control electric valve 50 before the desired time. Upon the occurrence of the first positive impulse of peaked voltage produced by transformer 75, electric valve 50 will be rendered conductive effecting discharge of the capacitance 45 through a circuit including contacts 67 of relay 65, resistance 58, primary winding 56 of transformer 55 and the anode-cathode circuit of valve 50. Due to the high rate of change of primary current through transformer 55, the glow discharge devices 59 and 60 break down, that is, are rendered conductive. Since these valves break down at the same value of voltage during each discharge of the capacitance 45, the magnitude, duration and hence the wave form of the periodic voltage generated by the inverter circuit remain substantially constant so that the duration of the periods of energization of the welding circuit 1 remain substantially constant, independently of variations in the magnitude of the voltage of capacitance 45 prior to the discharge thereof. Furthermore, the glow discharge valves 59 and 60 ionize or become nonconductive at a definite value of voltage and become nonconductive at just that value of flux in transformer 55 which upon decay thereof is just sufficient to discharge completely the capacitance 45, thereby tending to maintain a substantially uniform or constant periodic control voltage with respect to both magnitude and duration. It will be appreciated that upon the discharge of the capacitance 45, during a predetermined portion of that time the potential of the grid 16 of control valve 13 will be rendered sufficiently positive to render valve 13 conductive. This positive transient voltage is impressed on the grid 16 through conductor 17, and the interval of time during which the control voltage is sufficiently positive to render the valve 13 conductive may be controlled or adjusted by means of the intermediate contact 43 which determines the "time on" interval.

The operation of the system may be explained more fully by referring to the operating characteristics shown in Fig. 2 where curve A represents the voltage of circuit 2. The voltage of peaked wave form impressed on the control grid 53 of valve 50 by transformer 75 may be represented by curves B. The presence of this voltage initiates the generation of the periodic voltages represented by curve C. The positive portion of the curve C determines the period of conduction of valve 13 and hence the period of conduction of valves 4 and 5. The curves have been arbitrarily chosen to represent a condition in which the control circuit effects energization of the welding circuit 1 during three consecutive cycles and then maintains the circuit deenergized for the subsequent five cycles. This periodic energization is obtained for three successive periodic energizations at the expiration of the last of which the lockout circuit 80 becomes effective. The control electric valve 13 upon being rendered conductive transmits an impulse of positive current to the control member 8 of valve 5 and causes the transmission of current to the welding circuit 1. Since the control valve 12 is arranged in trailing or following relationship, the electric valve 4 will be rendered conductive following each half cycle of conduction by the electric valve 5. At time b, the potential of the grid 16 becomes sufficiently negative so that the electric valve 13 is nonconductive, thereby interrupting that immediate period of energization of welding circuit 1.

The capacitance is charged from the secondary winding 57 of transformer 55 while devices 59 and 60 are conductive transmitting an accurate definite charge to capacitance 87. Due to the fact that the valves 59 and 60 always maintain a fixed terminal voltage when conductive and become nonconductive at a fixed value of voltage, these impulses transmitted to the capacitance 87 will always be of the same magnitude and polarity to afford an accurate means of counting the impulses generated by the inverter circuit. The charges produced on the capacitance 87 by means of these impulses and hence the voltage of capacitance 87 are represented by curves D, E and F.

The curve G represents the negative "hold off" or discharge voltage of capacitance 70. As stated above, the capacitance 70 is charged during one-half cycle of voltage of circuit 2 only when the welding circuit 1 is energized, since the transformer 71 is connected across the transformer 3. The negative "hold off" voltage of capacitance 70 is operated against the variable positive voltage derived from resistance 76. This positive voltage may be represented by curves H and J. For the purpose of explanation, let it be assumed that the adjustable tap 77 of resistance 76 is adjusted to produce a positive bias voltage represented by curve H. The impulses of peaked voltage produced by transformer 75, and represented by curve B, are shown superimposed on curves G. The control electric valve 50 is maintained nonconductive during the next succeeding five cycles of voltage of supply circuit 2 until the negative "hold off" voltage produced by capacitance 70 decreases sufficiently to permit the peaked voltage, produced by transformer 75, in conjunction with the positive bias voltage to render valve 50 conductive. Under the above stated operating conditions, it will be apparent that the electric valve 50 will be rendered conductive at time c for the value of positive bias voltage represented by curve H.

An important advantage of my invention is the arrangement which permits the independent adjustment of the "time off" interval between the successive impulses of periodic control voltage. It will be seen that if the adjustable contact 77 is moved to the right to increase the positive biasing potential to a value corresponding to curve J, that the "time off" period will be substantially reduced since the electric valve 50 will be rendered conductive at time d. That is, the "time off"

period will be decreased from five to three cycles independently of the "time on" circuit adjustment.

Referring again to the operating characteristics shown by curves A, B, C and D at the top of Fig. 2, it is to be understood that after the generation of three impulses of periodic voltage by the single valve inverter, the voltage of capacitance 87 will increase as represented by curves D, E and F until at time e the voltage of capacitance 87 is sufficient to overcome the negative biasing potential furnished by resistance 90 to render the lockout valve 81 conductive. Upon being rendered conductive, valve 81 impresses a sufficiently negative voltage on the shield grid 54 of valve 50 to maintain valve 50 nonconductive until the circuit is reset by the operation of the push button 62. Upon operation of the push button 62, relays 63 and 65 are moved to the position shown in the drawings, in which case the discharge circuit for capacitance 87 is closed to discharge this capacitance through resistance 92 and contacts 68.

If the switch 61 is opened prior to the time the push button 62 is permitted to close, it will be understood that the circuit will remain inoperative. However, the mere operation of the push button 62 acts as a reset means to reinitiate the above described cycle of operation.

While I have shown and described my invention as applied to a particular system of connections and as embodying various devices diagrammatically shown, it will be obvious to those skilled in the art that changes and modifications may be made without department from my invention, and I, therefore, aim in the appended claims to cover all such changes and modifications as fall within the true spirit and scope of my invention.

What I claim as new and desire to secure by Letters Patent of the United States, is:

1. In combination, a source of direct current, a capacitance connected to be charged from said source, a circuit for discharging said capacitance to generate a periodic electrical timing impulse and comprising an electric valve having an anode, a cathode and a control member and means for energizing said control member to render said electric valve means conductive to initiate the generation of said impulse, and means connected in series relation with the anode-cathode circuit of said electric valve to discharge said capacitance completely independently of its initial charge.

2. In combination, a source of direct current having a pair of terminals, a capacitance connected to be charged from said source, a voltage divider connected across said source and having an intermediate connection, an output circuit connected between one of the terminals of said source and said intermediate connection, means for discharging said capacitance to generate a periodic electrical timing impulse and comprising in series relation an inductive device and an electric valve having an anode, a cathode and a control member and a control circuit for impressing on said control member a periodic voltage to render said electric valve means conductive periodically, and means comprising a glow discharge valve having a critical minimum ionizing-potential characteristic for controlling said inductive device to effect complete discharge of said capacitance.

3. In combination, a source of direct current having a pair of terminals, a voltage divider connected across said source and having an intermediate connection, a capacitance connected to be charged from said source, an output circuit connected between one of said terminals and said intermediate connection, means for periodically discharging said capacitance to impress on said output circuit a periodic electrical impulse and comprising a transformer and an electric valve means having an anode, a cathode and a control member, said transformer having a primary winding connected in series relation with the anode-cathode circuit of said electric valve and said capacitance and having a secondary winding, and means comprising a glow discharge valve having a critical minimum ionizing-potential characteristic connected across said secondary winding for completing a circuit in parallel with said secondary winding during a portion of the period of each discharge of said capacitance and for opening the parallel circuit when the flux of said transformer is of that value which will effect complete discharge of said capacitance without effecting a reversal of the polarity thereof.

4. In combination, a source of direct current having a positive and a negative terminal, a voltage divider connected across said terminals and having an intermediate connection, a capacitance connected to be charged from said source, a circuit connected across said source and connected to said capacitance for discharging said capacitance and to generate thereby a periodic electrical impulse and comprising an electric valve having an anode, a cathode and a control member, means for impressing on said control member a periodic voltage to render said electric valve means conductive periodically, an output circuit connected between the positive terminal of said direct current source and said intermediate connection, and means connected in the anode-cathode circuit of said electric valve to assure complete discharge of said capacitance.

5. In combination, a source of direct current having a pair of terminals, a voltage divider connected across said source and having an intermediate connection, an output circuit connected between said intermediate connection and one terminal of said direct current source, a capacitance connected to be charged from said source, means for discharging said capacitance to generate a periodic electrical impulse comprising in series relation an inductive device and an electric valve means having an anode, a cathode and control means, means for impressing a periodic voltage on said control means to render said electric valve means conductive periodically, a second electric valve, means connected across said inductive device and having a critical minimum operating potential characteristic for controlling the inductive reactance of said device to effect complete discharge of said capacitance, and means controlled by said last mentioned device for controlling said second electric valve to maintain said first mentioned electric valve non-conductive after the generation of a predetermined number of said impulses.

6. In combination, a source of direct current having a pair of terminals, a voltage divider connected across said source and having an intermediate connection, an output circuit connected between said intermediate connection and one terminal of said direct current source, a capacitance connected to be charged from said source, means for discharging said capacitance to impress on said output circuit a periodic electrical impulse comprising in series relation a transformer and an electric valve having an anode, a cathode and control means, said transformer having a primary winding connected in series relation with the anode-cathode circuit of said electric valve and having a secondary circuit, a second electric valve, having a grid, for controlling the potential of said control means, a circuit energized from said secondary winding for controlling the potential of said grid and comprising a capacitance and a unidirectional device connected across said secondary winding for transmitting to said capacitance unidirectional impulses of current corresponding in number to the number of said periodic impulses, and glow discharge means connected across said secondary winding to maintain the magnitude of said unidirectional impulses of current at a substantially constant value.

7. In combination, an alternating current supply circuit, a load circuit, translating means connected between said circuits and comprising a pair of reversely connected electric valves having control means, means for generating a periodic electrical impulse for energizing said control means to effect periodic energization of said load circuit during a predetermined interval of time, means responsive to the energization of said load circuit for controlling the generating means to determine the interval of time between successive energizations of said load circuit, and lockout means responsive to said electrical impulse for rendering the generating means inoperative after the generation of a predetermined number of said impulses.

8. In combination, an alternating current supply circuit, a load circuit, electric translating apparatus connected between said circuits and comprising a transformer and a pair of reversely connected main electric valves having control means, means for supplying to said control means a periodic electrical impulse to effect periodic energization of said load circuit, lockout means to render said last mentioned means inoperative, counting means responsive to said electrical impulse to effect actuation of said lockout means after the generation of a predetermined number of said impulses, and means for controlling the interval of time between the periodic energizations of said load circuit comprising a circuit responsive to the voltage appearing across said transformer for controlling the means which produces the periodic electrical impulses.

9. In combination, an alternating current supply circuit, a load circuit, electric translating apparatus connected between said circuits and comprising in series relation a transformer and a pair of reversely connected main electric valves having control means, means for generating a periodic electrical impulse for the energization of said control means to effect periodic energization of said load circuit and comprising a control electric valve having control means, means for impressing on said control last mentioned control means a periodic voltage, a lockout electric valve for controlling the potential of said last mentioned control means, means responsive to the voltage appearing across said transformer for controlling the potential of said last mentioned control means to control said electric valve and to determine thereby the interval between the periodic energizations of said load circuit, and a counting circuit responsive to said electrical impulse for actuating said lockout electric valve to maintain said control electric valve nonconductive after the generation of a predetermined number of said impulses.

10. In combination, an alternating current supply circuit, a load circuit, electric translating apparatus connected between said circuits and comprising in series relation a transformer and a pair of reversely connected main electric valve means having control means for determining the conductivity thereof, means including an electric circuit for supplying to said control means a periodic electrical impulse comprising an electric valve having a control member, means for energizing said control member to render said electric valve conductive periodically, and means for controlling the interval of time between the periodic energizations of said load circuit comprising a capacitance, a charging circuit for said capacitance responsive to the energization of said load circuit and having a time-constant equal to or less than one-half period of the voltage of said supply circuit, a discharge circuit for said capacitance having a substantially constant time-constant for impressing on said control member a hold-off voltage and means for producing a variable bias voltage in opposition to said hold-off voltage to control the period of time which said hold-off voltage is effective and to control thereby the interval of time between the periodic energizations of said load circuit.

11. In combination, an alternating current supply circuit, a load circuit, electric translating apparatus connected between said circuits and comprising in series relation a transformer and a pair of reversely connected main electric valves having control means for determining the conductivity thereof, a source of direct current, means for energizing said control means to effect periodic energization of said load circuit comprising a voltage divider connected across said source and having an intermediate connection, an interconnecting circuit between said source, said intermediate connection and said control means, means for impressing on said interconnecting circuit a periodic electrical impulse to determine the length of the periods of energization of said load circuit and comprising a capacitance connected to be charged from said source, a control electric valve having a control means and means for impressing on said last mentioned control means a periodic voltage to render said auxiliary electric valve conductive periodically, and means for determining the period of time between successive energizations of said load circuit comprising a circuit responsive to the energization of said load circuit including a second capacitance, a charging circuit for said second capacitance having a time-constant less than a period of the voltage of said supply circuit, a discharge circuit for said second capacitance for producing a hold-off voltage and a voltage divider energized from said source for producing a variable bias voltage acting in opposition to said hold-off voltage to determine the interval of time that said hold-off voltage is effective.

12. In combination, a source of current, a capacitance connected to be charged from said source, and means for completely discharging said capacitance independently of the magnitude of the voltage of said capacitance immediately prior to the discharge thereof comprising a discharge circuit including an inductive device and a glow discharge device connected to said inductive device and having a critical minimum ionizing-potential characteristic.

MAURICE E. BIVENS.